US008661875B2

(12) United States Patent
Zhou

(10) Patent No.: US 8,661,875 B2
(45) Date of Patent: Mar. 4, 2014

(54) SYSTEM AND METHOD TO DETECT ACCUMULATOR LOSS OF PRECHARGE

(75) Inventor: Heng Zhou, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 13/465,392

(22) Filed: May 7, 2012

(65) Prior Publication Data

US 2013/0291952 A1 Nov. 7, 2013

(51) Int. Cl.
*G01M 3/00* (2006.01)
*G01M 3/02* (2006.01)

(52) U.S. Cl.
USPC ..................... 73/40; 73/40.5 R; 73/46; 73/47; 73/49.7; 73/117.01; 73/117.02; 73/121

(58) Field of Classification Search
USPC ............................................ 73/117.1, 117.2
See application file for complete search history.

(56) References Cited

U.S. PATENT DOCUMENTS 3,662,333 A 5/1972 Howard et al.
4,781,061 A 11/1988 Baumgartl
5,074,145 A * 12/1991 Hattori et al. .............. 73/115.01
5,779,327 A 7/1998 Nakashima et al.
6,702,401 B2 3/2004 Sherriff
6,758,096 B1 7/2004 Schon et al.
2010/0294383 A1* 11/2010 Melbo et al. .................. 137/551
2011/0046901 A1 2/2011 Boissonneau et al.

FOREIGN PATENT DOCUMENTS

DE 10 2005 052 640 2/2007

* cited by examiner

*Primary Examiner* — Leonard Chang
*Assistant Examiner* — Irving A Campbell
(74) *Attorney, Agent, or Firm* — Miller, Matthias & Hull

(57) ABSTRACT

Methods and apparatus for detecting a leak in a gas precharged hydraulic accumulator having an initial gas charge entail activating a hydraulic pump to charge the gas precharged hydraulic accumulator and the hydraulic circuit associated with the gas precharged hydraulic accumulator when the hydraulic circuit and the hydraulic accumulator have a temperature that is substantially equivalent to an ambient temperature, e.g., on a cold start. The hydraulic pressure in the hydraulic circuit is monitored, and when a step in the hydraulic pressure is detected, various quantities are measured and used to determine a volumetric efficiency of the pump for use in later calculations of remaining gas amount.

19 Claims, 6 Drawing Sheets

SYSTEM AND METHOD TO DETECT ACCUMULATOR LOSS OF PRECHARGE

TECHNICAL FIELD OF THE DISCLOSURE

The present disclosure relates to precharged hydraulic accumulators and, more particularly, relates to a system and method for detecting loss of precharge pressure in such accumulators.

BACKGROUND OF THE DISCLOSURE

In large industrial machines such as mining and hauling trucks, it is not possible for a human operator to manually generate enough force to effectively brake or steer the machine. As such, most large trucks employ hydraulic power brakes and hydraulic power steering. These power systems direct a flow of high pressure hydraulic fluid to the machine's braking or steering actuators to effectuate the braking and steering commands given by the operator.

While a hydraulic pump may be able to supply the required flow in smaller machines, larger machines require the use of hydraulic accumulators to ensure adequate flow for braking and steering operations. A hydraulic accumulator is a device that accepts a certain volume of hydraulic fluid under pressure, and that may later release the pressurized hydraulic fluid into the machine hydraulic circuit (or brake or steering hydraulic circuit) when flow is required. In essence, an accumulator stores the output of the hydraulic pump so that the instantaneous available hydraulic flow at a later time is able to transiently exceed the output of the hydraulic pump.

There are many kinds of hydraulic accumulators, but a primary type in use today is the gas precharged hydraulic accumulator. The gas precharged hydraulic accumulator includes a vessel having therein a piston. The piston separates the inlet end of the vessel from the enclosed remainder of the vessel. The enclosed remainder of the vessel is precharged by a charge of high pressure gas, such that if there is no hydraulic pressure at the inlet, then the piston is close to the inlet and the gas is in a partially expanded state. Similarly, if there is high pressure at the inlet, then the piston is forced into the vessel, compressing the gas precharge and storing energy.

One problem with gas precharged hydraulic accumulators is that the gas precharge may leak, slowly or rapidly, rendering the accumulator ineffective for supplying peak hydraulic flow demands. This in turn may affect braking and steering, and so it is desirable to detect such a condition. In the past, it was known to periodically measure accumulator pressure to determine whether a leak had occurred. For example, U.S. Pat. No. 3,662,333 ("Hydraulic Accumulator Charge Detector and Indicating System"), discloses a technique for determining if an accumulator charge is low using repeated readings of a pressure sensitive transistor reflecting the pressure in the accumulator. In particular, when the circuit is not being used, the pressure sensitive transistor reading is stored or memorized. At a later time, if the pressure in the accumulator has dropped a predetermined amount below the stored pressure, a warning light is activated.

While such techniques may, averaged over time, provide a trend that evidences a leak, it will be appreciated that the use of the hydraulic system between readings could actually leave a leaking accumulator in a higher pressure state momentarily. This and other problems preclude the system of the U.S. Pat. No. 3,662,333 from effectively providing a real time indication of accumulator charge status.

The present disclosure is directed to a system that addresses one or more of the problems set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a method is provided for detecting a leak in a gas precharged hydraulic accumulator having an initial gas charge, in a hydraulic circuit associated with a hydraulic pump. The method includes activating the hydraulic pump to charge the hydraulic circuit and the hydraulic accumulator when the hydraulic circuit and the hydraulic accumulator have a temperature that is substantially equivalent to an ambient temperature and monitoring a hydraulic pressure in the hydraulic circuit. A step in the hydraulic pressure is detected and a measure of the amount of precharge gas remaining in the hydraulic accumulator is derived based on the hydraulic pressure at the step, the ambient temperature, and a maximum gas volume of the hydraulic accumulator.

In another aspect, a system is provided for detecting a gas leak in a gas precharged hydraulic accumulator having an internal volume divided by a piston, with a precharge of gas on a first side of the piston and hydraulic fluid and a hydraulic fluid inlet on a second side of the piston. The hydraulic accumulator is associated with a hydraulic circuit, and a hydraulic pump is in fluid communication with the hydraulic circuit. The system includes a temperature sensor located to sense a temperature of the precharge of gas, a fluid pressure sensor located to sense a pressure of hydraulic fluid at the hydraulic fluid inlet, a temperature sensor to sense hydraulic fluid temperature, and a controller. The controller is configured to detect a gas leak from the hydraulic accumulator by calculating a volumetric efficiency of the hydraulic pump during a first charge cycle of the hydraulic circuit by the hydraulic pump, and deriving a measure of an amount of gas remaining in the hydraulic accumulator after a subsequent charge cycle based on measurements from the temperature sensor and the fluid pressure sensor and based on the calculated volumetric efficiency of the hydraulic pump.

In yet another aspect, a truck is provided having at least one gas precharged hydraulic accumulator for facilitating a function with respect to the truck, the hydraulic accumulator having an internal volume divided by a piston, with a precharge of gas on a first side of the piston and hydraulic fluid and a hydraulic fluid inlet on a second side of the piston. The truck further includes a hydraulic circuit associated with the hydraulic accumulator, a hydraulic pump in fluid communication with the hydraulic circuit for charging the hydraulic circuit, a temperature sensor located to sense a temperature of the precharge of gas in the hydraulic accumulator, a fluid pressure sensor located to sense a pressure of hydraulic fluid at the hydraulic fluid inlet, and a controller. The controller is configured to detect a gas leak from the hydraulic accumulator by calculating a volumetric efficiency of the hydraulic pump during a first charge cycle of the hydraulic circuit by the hydraulic pump, and deriving a measure of an amount of gas remaining in the hydraulic accumulator after a subsequent charge cycle based on measurements from the temperature sensor and the fluid pressure sensor and based on the calculated volumetric efficiency of the hydraulic pump.

DETAILED DESCRIPTION OF THE DISCLOSURE

The present disclosure provides a system and method for detecting a loss of accumulator precharge in an automated manner. In overview, the system includes a fluid pressure sensor, a nitrogen gas temperature sensor, a microprocessor, an engine speed sensor, and a hydraulic fluid temperature sensor. A two-part protocol employs two phases, namely a cold start phase and a steady state phase, to determine accumulator gas remaining, with data gleaned from the cold start phase being used in the steady state phase.

Figure 1:
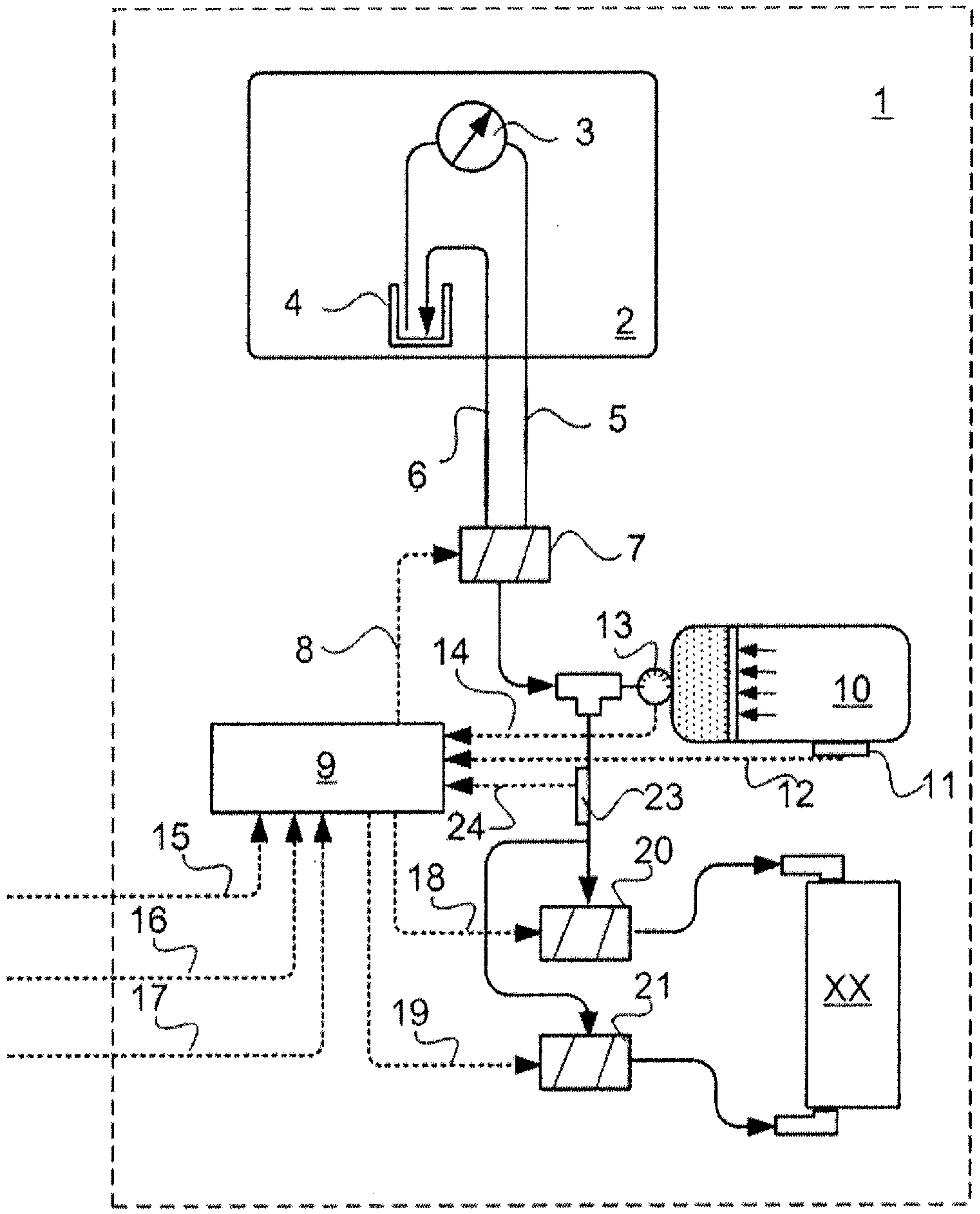
FIG. 1 is a system schematic diagram showing a machine hydraulic circuit within which one or more embodiments of the disclosed principles may be implemented.

Turning to a detailed description of an embodiment, FIG. 1 is a system schematic diagram showing a machine hydraulic circuit 1 including a machine hydraulic source 2 which includes a fluid source pump 3 and fluid return 4, the machine hydraulic source 2 being linked to the remainder of the machine hydraulic circuit 1 via an outlet line 5 and an inlet line 6. The outlet line 5 and inlet line 6 are selectively controlled through a three-position electrically actuated valve 7, which is controlled by one or more actuation signals 8 generated by a digital controller 9. It will be appreciated that one or more drivers or other processing or amplification components, not shown, may be interposed between the digital controller 9 and the three-position electrically actuated valve 7. The controller 9 may be a separate controller or may reside in, i.e., be implemented within, another controller such as the machine's engine control module (ECM).

To increase the maximum instantaneous flow in the circuit beyond that available from the fluid source pump 3 alone, the machine hydraulic circuit 1 further includes a gas precharged hydraulic accumulator 10. When operational, the gas precharged hydraulic accumulator 10 stores pressurized hydraulic fluid in general proportion to the pressure of the fluid. This is a result of a separation of an internal cavity of the gas precharged hydraulic accumulator 10 into a fluid portion and a pressurized gas portion, with an intermediate piston acting as a separator. The pressurized gas portion is precharged with an inert or nonreactive gas, e.g., nitrogen.

As hydraulic fluid under pressure enters the inlet of the gas precharged hydraulic accumulator 10, e.g., during charging of the hydraulic system, the piston moves through a continuum of instantaneous equilibrium positions, with the pressure on each side of the piston being balanced in equilibrium. In other words, when the piston is not moving, the pressure of the hydraulic fluid in the gas precharged hydraulic accumulator 10 (i.e., at the inlet to the gas precharged hydraulic accumulator 10) is equal to the pressure exerted by the compressed gas charge on the other side of the separator piston. Thus, in normal operation, the greater the volume of fluid forced into the gas precharged hydraulic accumulator 10, the greater its pressure.

The gas precharged hydraulic accumulator 10 is instrumented to provide data to the controller 9 to facilitate operation of the leak detection system described herein. In particular, the gas precharged hydraulic accumulator 10 includes a temperature sensor 11 for measuring and conveying the temperature of the gas side of the gas precharged hydraulic accumulator 10. A temperature sensor data line 12 conveys measurement data from the temperature sensor 11 to the controller 9. In addition, data from a hydraulic fluid temperature sensor 23 is conveyed to the controller 9 via a second temperature sensor data line 24.

The gas precharged hydraulic accumulator 10 also includes an inlet pressure meter 13 for measuring the pressure of the hydraulic fluid on the fluid side of the gas precharged hydraulic accumulator 10. For conveying the resultant pressure measurements to the controller 9 for use in leak detection, a pressure sensor data line 14 links the inlet pressure meter 13 to the controller 9.

In an embodiment, the controller 9 utilizes other machine parameters in the leak sensing calculations as will be apparent from the later discussion of a specific technique. Thus, for example, the controller 9 also receives an engine speed signal via engine speed line 15. Other signals may include an ambient atmospheric temperature signal received by the controller 9 via an outside temperature line 16.

The controller 9 may control machine functions such as steering and/or braking in addition to performing leak detection. Alternatively, another controller, not shown, may be used for machine control. When the controller 9 is employed for machine control, it receives one or more machine control inputs 17, e.g., from a user interface, to signal a braking command, steering command, or other machine function command. In this embodiment, the controller provides one or more machine function actuator outputs 18, 19 to control one or more hydraulic solenoid valves 20, 21 or other electronically controlled hydraulic metering devices, to control a hydraulic actuator 22. The hydraulic actuator 22 may be, for example, a brake caliper, a steering actuator, and so on.

It will be appreciated that for the sake of clarity, only the outgoing hydraulic path has been shown. As the system operates, return lines are employed to return fluid to the fluid return 4 of the machine hydraulic source 2 for repressurization by the fluid source pump 3. Moreover, although a single accumulator is illustrated, a large industrial machine will typically employ multiple accumulators. For example, four separate accumulators may be used for braking, and two for steering. The leak detection techniques described herein apply equally to such scenarios. Moreover, it will be appreciated that multiple hydraulic pumps may be used to power multiple hydraulic circuits, and each such circuit may support independent leak detection.

Figure 2:
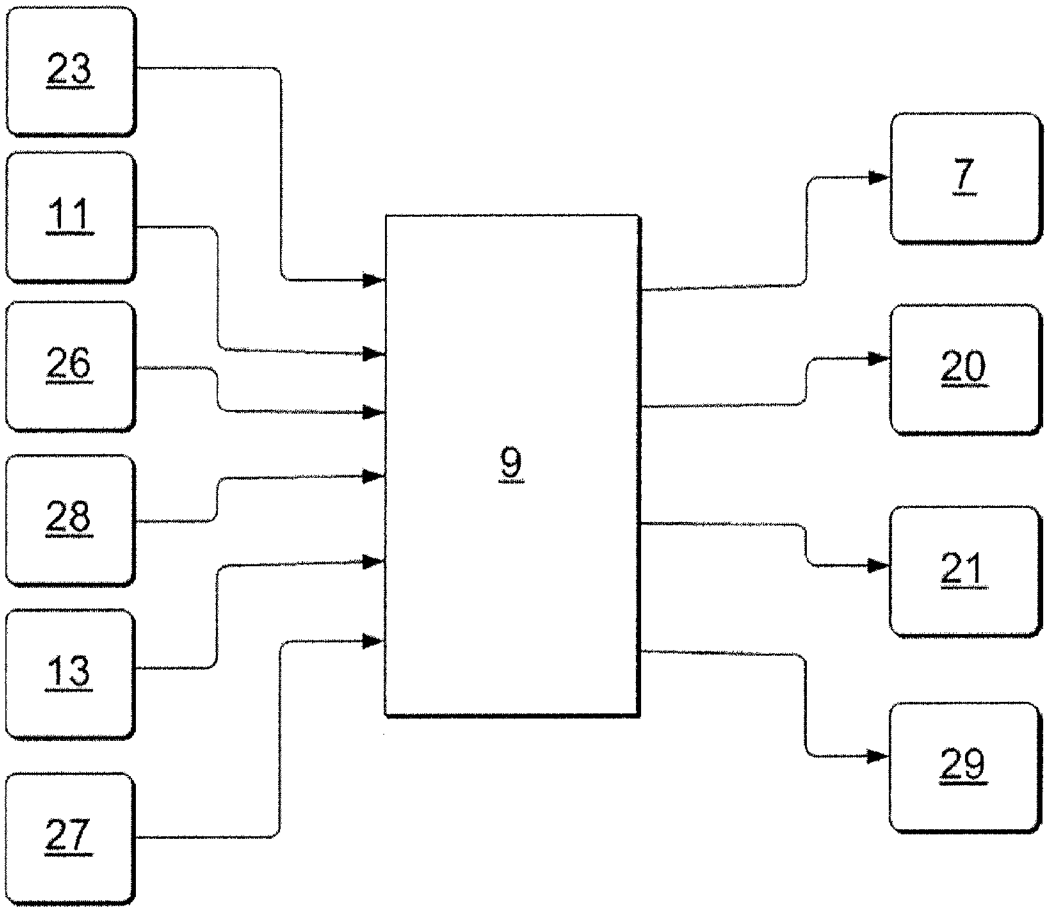
FIG. 2 is a circuit schematic in keeping with FIG. 1 for implementing a leak detection protocol.

A circuit schematic in keeping with the embodiment of FIG. 1 and the later-described techniques is shown in FIG. 2. The system circuit 25 includes the controller 9, the function of which will be discussed briefly in connection with FIG. 2 and in greater detail with reference to FIGS. 3-5. In addition to the controller 9, the system circuit 25 includes the temperature sensor 11, hydraulic fluid temperature sensor 23, an engine speed sensor 26, the inlet pressure meter 13, and an ambient temperature sensor 27. In addition, a user interface group 28 is included. The foregoing elements provide inputs to the controller 9, both for leak detection purposes and for machine control purposes. Though not shown, the controller 9 may also be linked to, and control, other elements such as a machine engine, the fluid source pump 3, and so on.

With respect to the output of data and commands, the controller 9 provides output signals for control of the hydraulic circuit and control of the hydraulic actuator associated with the accumulator. To this end, the controller 9 provides output signals to the three-position electrically actuated valve 7 as well as to the one or more hydraulic solenoid valves 20, 21 for machine control. In addition, the controller 9 provides a diagnostic output to a warning element 29. The warning element may be an indicator light or memory location used to warn either the operator or maintenance personnel regarding a potential leak detected by the system.

Figure 3:
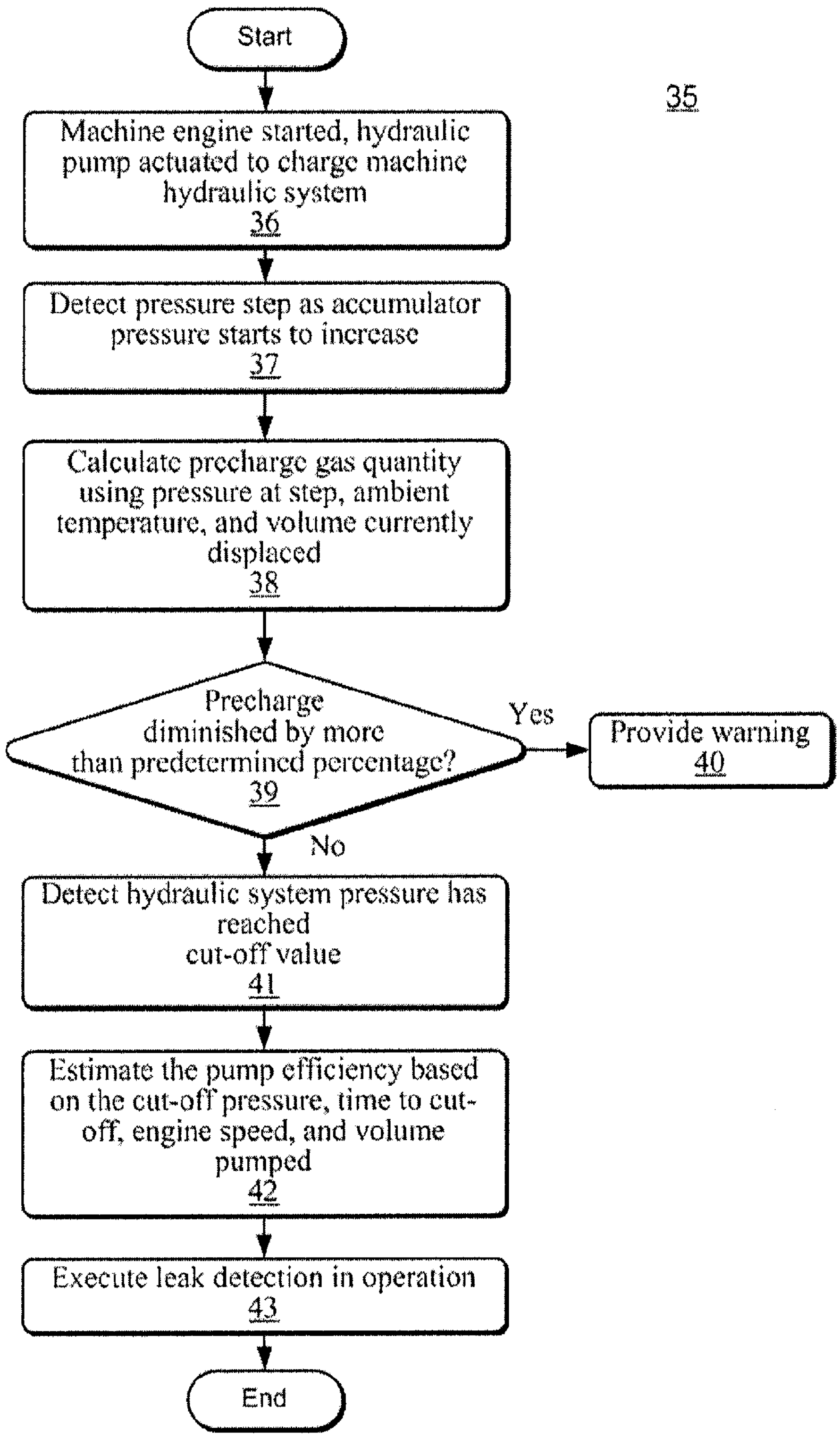
FIG. 3 is a flow chart illustrating a process for cold start leak detection and data gathering in an embodiment of the disclosed principles.
Figure 4:
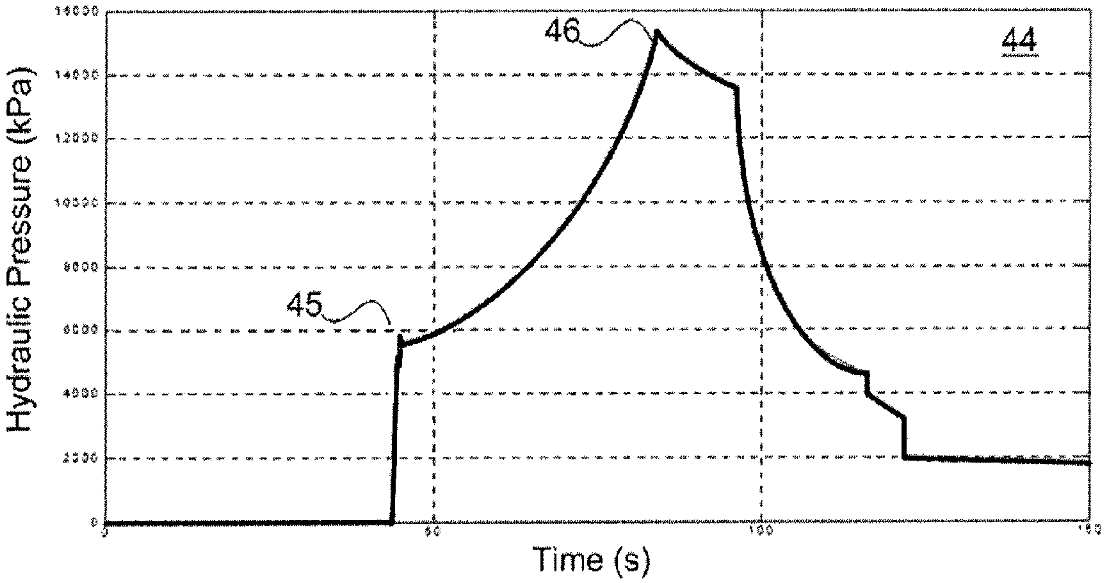
FIG. 4 is a pressure diagram illustrating certain system pressure behavior during cold start calibration and leak detection.

As noted above, the described leak detection technique operates in two phases, which in an embodiment are a cold start phase and a steady state phase. Referring to FIG. 3 and FIG. 4, the cold start phase will be described first. In particular, FIG. 3 illustrates a flow chart of a cold start leak detection and data gathering process 35 wherein nitrogen mass is estimated at cold start with only measurement of fluid pressure. FIG. 4 illustrates certain system pressure behavior during the cold start phase.

The cold start leak detection and data gathering process 35 is executed when the machine of interest has been unused for period of time sufficient to allow all hydraulic components to acclimate to essentially ambient temperature. For example, the cold start leak detection and data gathering process 35 may be executed after the machine has been parked and inactive overnight.

At stage 36 of the process 35, the machine engine is started and the hydraulic pump is actuated to pressurize or "charge" the machine hydraulic system. At stage 37, the controller 9 detects a pressure step or jump in the hydraulic circuit, signifying the point in time that the accumulator pressure starts to increase. Such a pressure jump 45 can be seen in the plot 44 of FIG. 4 at approximately 45 seconds. In particular, FIG. 4 shows the system pressure rising suddenly from approximately 0 kPa to almost 6000 kPa in the space of one or two seconds.

At stage 38, the controller calculates the quantity of precharge gas using the pressure value at the step, the ambient temperature, and the known volume that the gas currently displaces. With respect to the latter, when the system is unpressurized, the gas volume is the entire volume of the accumulator, since the piston will have moved as far as possible toward the inlet under the influence of the gas portion of the device.

Thus, in the illustrated example, the controller 9 applies the ideal gas law to estimate the quantity of gas molecules remaining in the precharge. The ideal gas law indicates that for an adiabatic system, the pressure (in Pascals) multiplied by the volume (in liters) is equal to the product of the number of gas atoms or molecules (in moles), the temperature (absolute, Kelvin), and a constant R ($8.314\ J \cdot K^{-1} \cdot mol^{-1}$). Given the time scale, it is reasonable to assume an adiabatic process, for which $PV^{\gamma}$ is constant (for a diatomic gas such as nitrogen, $\gamma=7/5$).

Based on the calculated number of moles of gas remaining and the known starting content of the precharge, the controller 9 determines at stage 39 whether the precharge has diminished by more than a predetermined percentage or, alternatively, a predetermined amount. If the precharge has diminished by more than the predetermined percentage, the process 35 moves to stage 40, wherein the controller 9 generates a warning to the user or to service personnel as mentioned above. In particular, the warning may be conveyed by setting a warning light in the operator cap, and/or may be conveyed by setting a diagnostic flag in memory. In an embodiment, once the warning is set, it remains set regardless of changes in the system until the accumulator is checked and charged or replaced if necessary.

Moving forward, the controller proceeds to calibrate the hydraulic pump efficiency so that this value can be used during steady state or "hot" leak detection. In particular, the hydraulic system as it is being pressurized is a closed system, with the only increase in fluid volume occurring in the accumulator. Thus, at stage 41, the controller 9 detects that the hydraulic system pressure has reached a cut-off value, e.g., 15000 kPa and deactivates the hydraulic pump.

At stage 42, the controller 9 estimates the pump efficiency based on the cut-off pressure, the amount of time taken to reach the cut-off pressure (about 35 seconds after the pressure step in the illustrated example), the engine speed, and the volume pumped within the given time. As to this last quantity, since the number of moles of gas in the accumulator is now known, and the cut-off pressure is known, the gas volume can be calculated and subtracted from the overall accumulator volume to yield the pumped volume. The efficiency at the known engine speed is then calculated as the quotient of the pumped volume and the elapsed time to reach cut-off after the pressure step.

Figure 5:
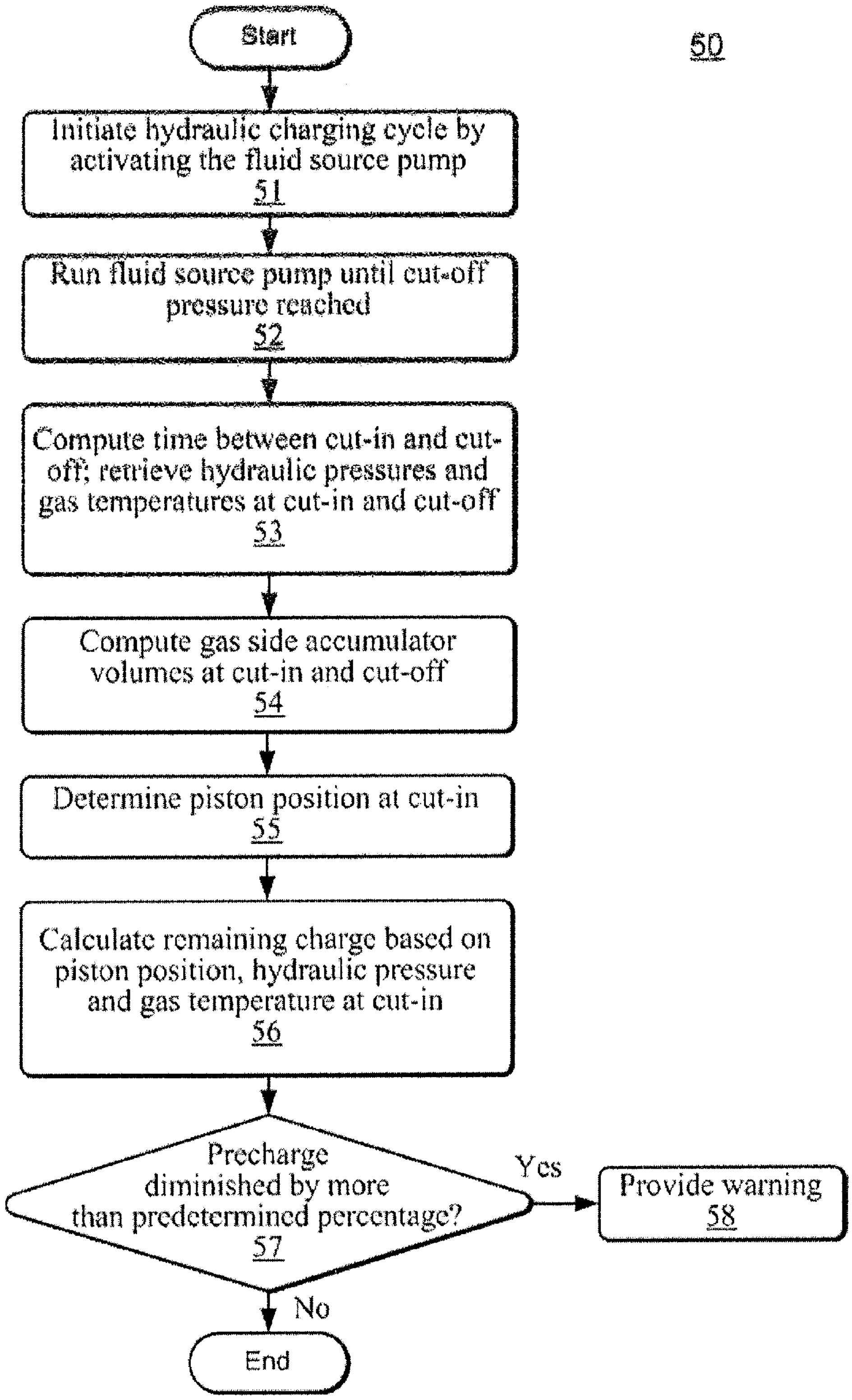
FIG. 5 is a flow chart illustrating a process for operational time leak detection in keeping with an aspect of the disclosed principles.

The controller 9 moves to the operational time leak detection process at stage 43. This process 50, shown in FIG. 5, is executed when the machine has been running and has executed at least one additional cut-in and cut-off cycle. The process 50 operates by calculating remaining precharge gas mole quantities based on pressure, temperature, and volume, with the volume being derived using the efficiency calculated during the cold start process 35.

In greater detail, at stage 51 of the process 50, the controller 9 initiates a hydraulic charging cycle by activating the fluid source pump 3 at the appropriate pressure level. The controller 9 allows the fluid source pump 3 to run until the appropriate cut-off pressure is reached at stage 52. At stage 53, the controller 9 computes the time elapsed between cut-in and cut-off (t), retrieves the hydraulic pressures at cut-in and cut-off ($P_1$ and $P_2$ respectively) and retrieves the gas temperatures at cut-in and cut-off ($T_1$ and $T_2$ respectively). The engine speed, which may be constant, is also retrieved at this stage.

With pressure, temperature and elapsed time known, and with the pump efficiency and engine speed known, the controller 9 solves for the gas side volumes in the accumulator at cut-in and cut-off ($V_1$ and $V_2$ respectively) at stage 54. In an embodiment, these volumes are computed by solving the following system of equations:

$$V_2 - V_1 = \int f * t * dt = D * \int \eta * N * dt$$

and $$\frac{V_1}{V_2} = \frac{T_1 * P_1}{T_2 * P_2}$$

where f is the pump's average flow rate, D is the pump displacement, N is the engine speed, and $\eta$ is the volumetric efficiency of the hydraulic pump.

Having found $V_1$ and $V_2$, the controller 9 determines at stage 55 the actual piston position at the cut-in time. Using the piston position at the cut-in time, the cut-in pressure and cut-in gas temperature, the controller 9 calculates the amount of nitrogen gas left in accumulator at stage 56. At stage 57, the controller determines whether the remaining amount of gas differs from the precharge amount by more than a predetermined extent, e.g., a predetermined percentage or predetermined mole amount. If the remaining amount of gas differs from the precharge amount by more than the predetermined extent, the controller 9 issues a warning at stage 58, as described above. Otherwise, the process 50 terminates after stage 58.

INDUSTRIAL APPLICABILITY

In general terms, the present disclosure sets forth a system and method for detecting a loss of precharge gas in a gas precharged accumulator used for braking or steering applications. Not only can the disclosed system and technique prevent loss of function in the brake or steering systems, but they also reduce the need for frequent checks of the accumulator. This in turn increases production uptime and eliminates unplanned shutdowns.

Any machine that relies on gas precharged hydraulic accumulators can benefit from the disclosed system, including autonomous trucks, large mining trucks, and so on. Moreover, the disclosed system and technique may be used in independent hydraulic systems or in circuits having multiple accumulators.

Figure 6:
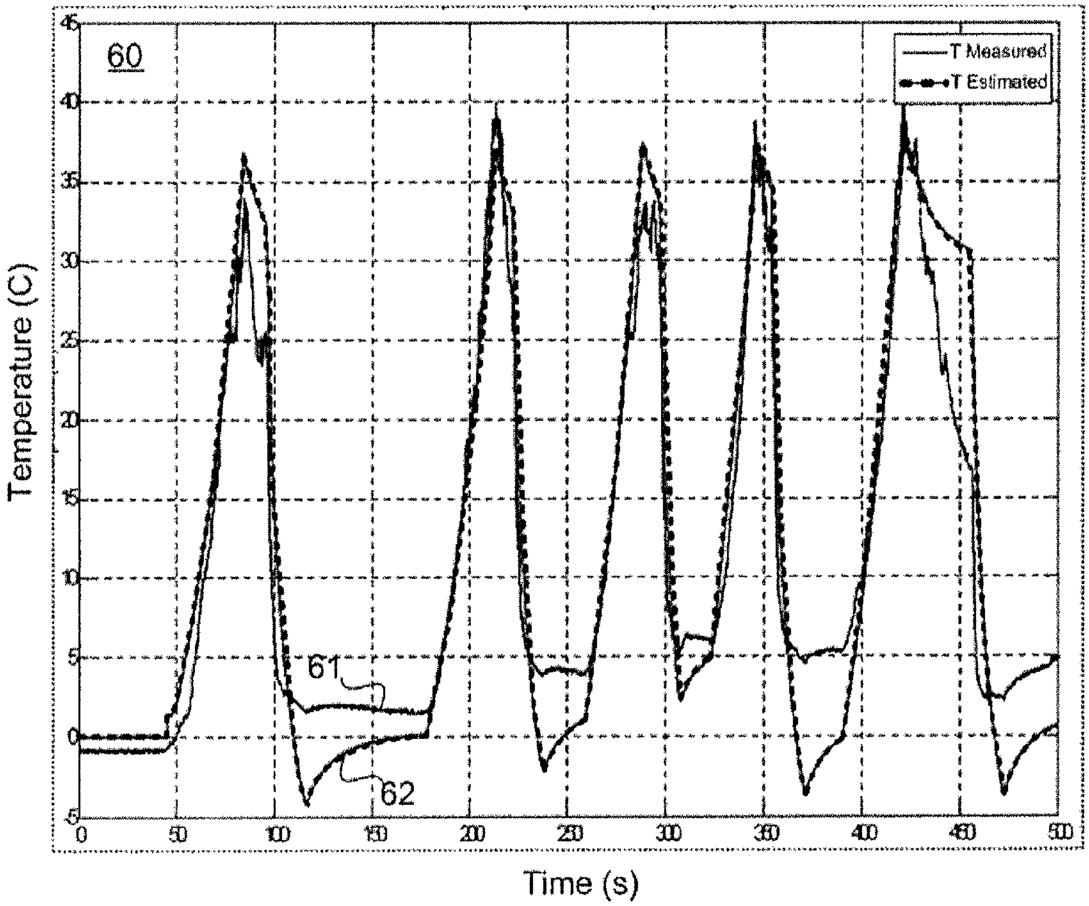
FIG. 6 is a temperature data plot showing a measured precharged gas temperature overlaid on an estimated precharged gas temperature to verify an assumption of adiabatic behavior.

While the disclosed technique employs certain approximations, primarily related to the assumption of adiabatic behavior in the precharge gas, it has been found that these approximations do not substantially affect the outcome of the detection process. In this connection, FIG. 6 is a temperature data plot 60 showing a measured precharged gas temperature 61 overlaid on an estimated precharged gas temperature 62. The estimated precharged gas temperature 62 is derived from pressure measurements using the adiabatic assumption, and the overlay illustrates the extent to which the processes involved in compressing and releasing the gas precharge can be considered adiabatic, i.e., not thermally conducting to the external environment.

As can be seen, the measured and estimated data are in close agreement. This correlation indicates that the assumption of adiabatic behavior underlying the leak detection process is a realistic and reasonable assumption. It will be appreciated that the present disclosure provides a system and method for leak detection with respect to one or more gas precharged hydraulic accumulators, e.g., for steering or braking. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for detecting a leak in a gas precharged hydraulic accumulator having an initial gas charge, in a hydraulic circuit associated with a hydraulic pump, the method comprising:

activating the hydraulic pump to charge the hydraulic circuit and the hydraulic accumulator when the hydraulic circuit and the hydraulic accumulator have a temperature that is substantially equivalent to an ambient temperature;

monitoring a hydraulic pressure in the hydraulic circuit;

detecting a step in the hydraulic pressure at a first time based on the monitoring; generating a measure of an amount of precharge gas remaining in the hydraulic accumulator based on the hydraulic pressure at the step, the ambient temperature, and a maximum gas volume of the hydraulic accumulator; and comparing the amount of precharge gas remaining in the hydraulic accumulator with the initial gas charge and determining that a gas leak exists in the hydraulic accumulator if the amount of precharge gas remaining in the hydraulic accumulator is less than the initial gas charge by greater than a predetermined extent.

2. The method for detecting a leak in a gas precharged hydraulic accumulator according to claim 1, further comprising:

determining that the hydraulic pressure has reached a predetermined cut-off value at a second time;

deriving a measure of a volumetric efficiency of the hydraulic pump based on the predetermined cut-off pressure, the first time, the second time, an engine speed, and a volume pumped by the hydraulic pump between the first time and the second time.

3. The method for detecting a leak in a gas precharged hydraulic accumulator according to claim 2, wherein deriving a measure of a volumetric efficiency comprises deriving a number of moles of gas in the hydraulic accumulator, calculating a gas volume based on the number of moles and the cut-off pressure, subtracting the calculated gas volume from a total accumulator volume to yield a pumped volume, and calculating an efficiency for the engine speed as a quotient of the pumped volume and a difference between the first time and the second time.

4. The method for detecting a leak in a gas precharged hydraulic accumulator according to claim 2, further comprising:

activating the hydraulic pump again at a third time to charge the hydraulic circuit and the hydraulic accumulator when the hydraulic pressure falls below a predetermined cut-in pressure and deactivating the hydraulic pump at a fourth time when the hydraulic pressure reaches the predetermined cut-off value;

determining accumulator gas volume at the third time and the fourth time based on gas temperature and pressure at the third time and fourth time respectively, and determining the position of a separator piston in the accumulator at the third time based on the determined gas volume at the third time; and determining a remaining amount of precharge gas in the hydraulic accumulator based on the determined piston position, hydraulic pressure and gas temperature at the third time.

5. The method for detecting a leak in a gas precharged hydraulic accumulator according to claim 4, further comprising determining whether the remaining amount of precharge gas differs from the initial gas charge by more than the predetermined extent and issuing a warning if it is determined that the remaining amount of precharge gas differs from the initial gas charge by more than the predetermined extent.

6. The method for detecting a leak in a gas precharged hydraulic accumulator according to claim 4, wherein issuing a warning includes at least one of conveying a warning indication to an operator and setting a diagnostic flag.

7. The method for detecting a leak in a gas precharged hydraulic accumulator according to claim 1, wherein the hydraulic circuit is linked to one of a machine braking system and a machine steering system.

8. The method for detecting a leak in a gas precharged hydraulic accumulator according to claim 1, wherein generating a measure of an amount of precharge gas remaining in the hydraulic accumulator comprises applying the ideal gas law to estimate the quantity of gas molecules remaining in the precharge assuming an adiabatic process.

9. A system for detecting a gas leak in a gas precharged hydraulic accumulator having an internal volume divided by a piston, with a precharge of gas on a first side of the piston and hydraulic fluid and a hydraulic fluid inlet on a second side of the piston, the hydraulic accumulator being associated with a hydraulic circuit, a hydraulic pump being in fluid communication with the hydraulic circuit, the system comprising:

a temperature sensor located to sense a temperature of the precharge of gas;

a fluid pressure sensor located to sense a pressure of hydraulic fluid at the hydraulic fluid inlet; and a controller configured to detect a gas leak from the hydraulic accumulator by calculating a volumetric efficiency of the hydraulic pump during a first charge cycle of the hydraulic circuit by the hydraulic pump, and deriving a measure of an amount of gas remaining in the hydraulic accumulator after a subsequent charge cycle based on measurements from the temperature sensor and the fluid pressure sensor and based on the calculated volumetric efficiency of the hydraulic pump.

10. The system for detecting a gas leak in a gas precharged hydraulic accumulator according to claim 9, wherein the controller is configured to calculate the volumetric efficiency of the hydraulic pump by timing the first charge cycle between a predetermined cut-in pressure and a predetermined cut-off pressure, and deriving a measure of a volumetric efficiency of the hydraulic pump based on the predetermined cut-off pressure, the duration of the charge cycle, an engine speed, and a volume pumped by the hydraulic pump during the first charge cycle.

11. The system for detecting a gas leak in a gas precharged hydraulic accumulator according to claim 10, wherein the controller is further configured to calculate the volumetric efficiency of the hydraulic pump by deriving a measure of an amount of gas in the hydraulic accumulator, calculating a gas volume based on the amount of gas and the predetermined cut-off pressure, subtracting the calculated gas volume from a total accumulator volume to yield a pumped volume, and calculating an efficiency for the engine speed, hydraulic fluid temperature as a quotient of the pumped volume and the duration of the charge cycle.

12. The system for detecting a gas leak in a gas precharged hydraulic accumulator according to claim 10, wherein the controller is further configured to derive the measure of an amount of gas remaining in the hydraulic accumulator after a subsequent charge cycle by determining accumulator gas volume at the start and end of the subsequent charge cycle based on gas temperature and pressure, determining a position of the piston at the start of the subsequent charge cycle based on the determined gas volume at the start of the subsequent charge cycle, and determining an amount of gas remaining in the hydraulic accumulator based on the determined piston position, hydraulic pressure and gas temperature at the start of the subsequent charge cycle.

13. The system for detecting a gas leak in a gas precharged hydraulic accumulator according to claim 12, wherein the controller is further configured to determine whether the amount of gas remaining in the hydraulic accumulator differs from an initial gas charge by more than the predetermined extent and issuing a warning if it is determined that the amount of gas remaining in the hydraulic accumulator differs from the initial gas charge by more than the predetermined extent.

14. The system for detecting a gas leak in a gas precharged hydraulic accumulator according to claim 13, wherein the warning includes at least one of a visual warning indication to an operator and the setting of a diagnostic flag.

15. The system for detecting a gas leak in a gas precharged hydraulic accumulator according to claim 9, wherein the hydraulic circuit is linked to one of a machine braking system and a machine steering system.

16. The system for detecting a gas leak in a gas precharged hydraulic accumulator according to claim 9, wherein the controller is configured to apply the ideal gas law and assume an adiabatic process while calculating the volumetric efficiency of the hydraulic pump during the first charge cycle.

17. A truck having at least one gas precharged hydraulic accumulator for facilitating a function with respect to the truck, the hydraulic accumulator having an internal volume divided by a piston, with a precharge of gas on a first side of the piston and hydraulic fluid and a hydraulic fluid inlet on a second side of the piston, the truck further comprising:

a hydraulic circuit associated with the hydraulic accumulator;

a hydraulic pump in fluid communication with the hydraulic circuit for charging the hydraulic circuit;

a temperature sensor located to sense a temperature of the precharge of gas in the hydraulic accumulator;

a fluid pressure sensor located to sense a pressure of hydraulic fluid at the hydraulic fluid inlet; and a controller configured to detect a gas leak from the hydraulic accumulator by calculating a volumetric efficiency of the hydraulic pump during a first charge cycle of the hydraulic circuit by the hydraulic pump, and deriving a measure of an amount of gas remaining in the hydraulic accumulator after a subsequent charge cycle based on measurements from the temperature sensor and the fluid pressure sensor and based on the calculated volumetric efficiency of the hydraulic pump.

18. The truck in accordance with claim 17, wherein the function is one of a truck braking system and a truck steering system.

19. The truck in accordance with claim 17, wherein the controller is further configured to issue a warning if a gas leak from the hydraulic accumulator of greater than a predetermined extent is detected.

* * * * *